United States Patent [19]

Johnson

[11] 3,819,268

[45] June 25, 1974

[54] VELOCITY DETERMINATION WITH OPTOELECTRONIC LINEAR POSITION TRANSDUCER

[75] Inventor: Albin Kenneth Johnson, Boulder, Colo.

[73] Assignee: Iomec, Inc., Santa Clara, Calif.

[22] Filed: Aug. 10, 1972

[21] Appl. No.: 279,604

[52] U.S. Cl.................. 356/28, 324/173, 324/175, 340/174 A
[51] Int. Cl. ............................................ G01p 3/36
[58] Field of Search ............ 356/28; 346/18; 317/5; 324/160, 172, 173, 175; 250/219 DD, 231 SE; 340/174 A, 174 K

[56] References Cited
UNITED STATES PATENTS
2,979,623  4/1961  Fowell ................................. 356/28

Primary Examiner—Maynard R. Wilbur
Assistant Examiner—S. C. Buczinski
Attorney, Agent, or Firm—Townsend & Townsend

[57] ABSTRACT

A system for electronically determining the velocity of a linear motion actuator such as used in a magnetic disc file unit by processing the output from an optoelectronic position transducer associated with the actuator to obtain a velocity signal. One or both of the 90° phase-displaced output signals from a pair of photodetectors in the position transducer are time differentiated. The time derivative signal is positively or negatively full-wave rectified depending on the direction of actuator motion to produce a signal carrying velocity information in its peak-amplitude and polarity. According to one embodiment rectification is accomplished by appropriately gating the time derivative of one photodetector output and its inverse respectively through a pair of analog switches using gating pulses developed from the other photodetector output signal. The rectified combined signal is then peak detected and filtered to produce a substantially continuous DC velocity signal. An extension of this arrangement superimposes the 90° phase-displaced full-wave rectified time derivative signals from both photodetectors to eliminate signal transitions for high performance applications. Another variation of the present invention provides minimal circuit component cost in an arrangement which uses the logical direction signal from the position transducer to gate either the positive or negative rectified time derivative signal through the switching network.

21 Claims, 22 Drawing Figures

FIG_1

FIG_3

FIG_5

FIG. 1A

FIG_2A

FIG_4A

FIG_6A

FIG_7

VELOCITY DETERMINATION WITH OPTOELECTRONIC LINEAR POSITION TRANSDUCER

The present invention relates to linear motion mechanisms and is more particularly directed to a system for electronically determining the velocity of a linear motion mechanism such as the moving coil actuator in a direct access disc file system.

High performance direct access disc file systems are commonly used in conjunction with modern data processing systems as large capacity auxiliary memories. Disc file systems of the moving head type require highly accurate positioning of the read-write head at a precise radial location over the disc corresponding to an addressed track. In order to consistently achieve the required degree of precision, the linear position transducer must perform the functions of track initialization and counting, as well as direction sensing.

This position information is typically derived in existing systems of this type by an opto-electronic position transducer which illuminates a pair of photosensitive devices such as photodiodes or phototransistors with a modulated light beam in order to generate a pair of output signals bearing relative position information. The light beam which may be visible or infrared is emitted either from an incandescent or solid state light source and is modulated by a shuttering mechanism generally comprising a stationary mask and a shutter attached to the moving actuator which carries the magnetic read-write head.

The servo-control for positioning the read-write head actuator also requires an accurate velocity signal. In contrast to the above opto-electronic systems used for generating the position signal, present disc file systems typically develop the velocity signal with an electromechanical velocity transducer. This velocity transducer operates on the principle of a magnet moving through a coil with the change in magnetic flux over time being proportional to velocity. Among the undesirable characteristics of this type of device are the requirements of critical mechanical mounting and alignment which adds to the mass and friction of the moving actuator and limited bandwidth due to the relatively low mechanical resonant frequency of the system.

Accordingly, it is an object of the present invention to provide a system for the detection of actuator velocity by electronically processing the output signal from the photosensitive position transducer. In addition to eliminating the critical mechanical mounting and alignment problems associated with conventional electromechanical velocity transducers and the resulting increased mass and friction of the actuator, the present invention provides a velocity transducer whose bandwidth is limited only by the relatively high bandwidth of the electronic components as compared to a low mechanical resonant frequency of the replaced electromechanical type of device. Furthermore, the invention in one form is applicable to low-cost moderate performance systems but is extendable both to very high performance systems and to a minimal circuit component cost system. The present invention is operable with position output waveforms ranging from triangular to sinusoidal in shape and utilizes low-cost, off-the-shelf electronic components.

A highly efficient integrated linear positioning system is achieved when the present invention is combined with a track count initialization system such as that described in copending U.S. Patent Application entitled "OPTO-ELECTRONIC TRANSDUCER FOR POSITION INITIATILIZATION OF A LINEAR MOTION MECHANISM," Ser. No. 203,724 filed Dec. 1, 1971 and a position transducer feedback control system such as that described in my copending U.S. Patent Application entitled "FEEDBACK CONTROL SYSTEM FOR LINEAR POSITION TRANSDUCER," Ser. No. 258,779 filed June 1, 1972.

In addition to the above objects, features and advantages of the present invention, others will be apparent after reading the following detailed description with reference to the accompanying drawings, wherein:

FIG. 2B is a waveform diagram of the phase B photodetector output signal as a function of position with the system of FIG. 1;

FIG. 2C is a waveform diagram of the phase A photodetector output signal as a function of time at constant velocity with the system of FIG. 1;

FIG. 2D is a waveform diagram of the phase B photodetector output signal for forward and reverse actuator motion as a function of time at constant velocity with the system of FIG. 1;

FIG. 2E is a waveform diagram of the time derivative of the phase A photodetector output signal of FIG. 2C;

FIG. 2F is a waveform diagram of the digital commutating signal for forward and reverse actuator motion used to full-wave rectify the time derivative signal of FIG. 2E;

FIG. 2G is a waveform diagram of the time-derivative signal of FIG. 2E as full-wave rectified by the forward and reverse commutating signals of FIG. 2F;

FIG. 2H is a waveform diagram of the rectified signal of FIG. 2G which has been peak detected and filtered to produce a velocity signal;

FIG. 4B is a waveform diagram of the full-wave rectified time-derivative of the phase B photodetector output signal for forward and reverse actuator motion at constant velocity with the system of FIG. 3;

FIG. 4C is a waveform diagram of the signals of FIGS. 4A and 4B for forward actuator motion which have been combined and peak detected to produce a velocity signal;

FIG. 6B is a waveform diagram of the positive-half-wave rectified time-derivativative of the signal of FIG. 6A;

FIG. 6C is a waveform diagram of the negative-half-wave rectified time-derivative of the signal of FIG. 6A;

FIG. 6D is a waveform diagram of the signal of FIG. 6B which has been positive full-wave rectified to produce a velocity signal representing actuator motion in one direction;

Figure 1:
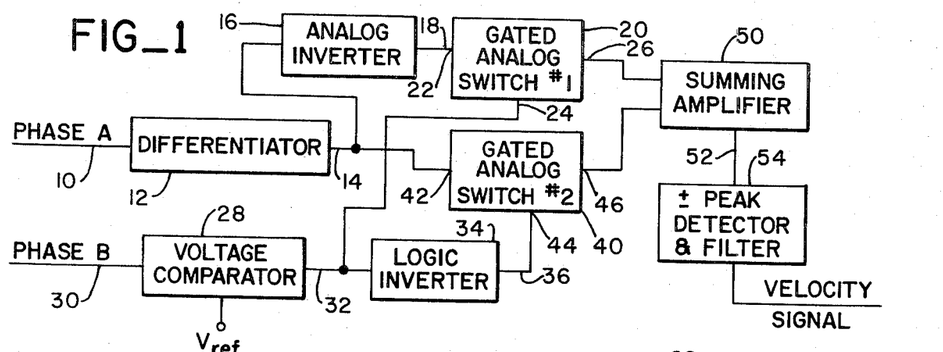
FIG. 1 is a block diagram representation of the velocity signal generation system of the present invention according to one preferred embodiment.

Referring now to the drawings, one embodiment of the velocity signal generating system of the present invention appears in block diagram form in FIG. 1 with its characteristic waveforms depicted in FIGS. 2A through 2H. The system is responsive to the position information output signals from a conventional optoelectronic position transducer associated with the linear motion actuator.

Figure 1A:
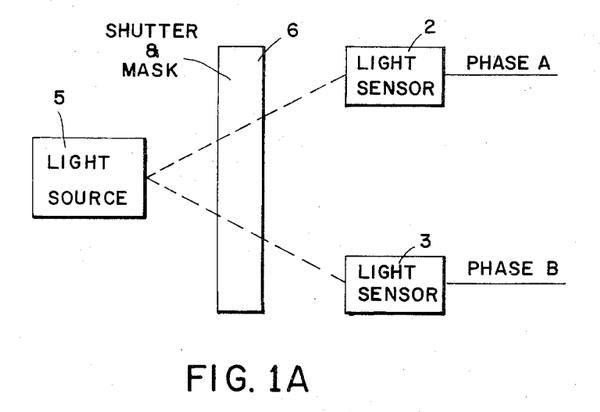
FIG. 1A is a block diagram representation of a typical arrangement for generating a pair of photo detector output signals.
Figure 2A:
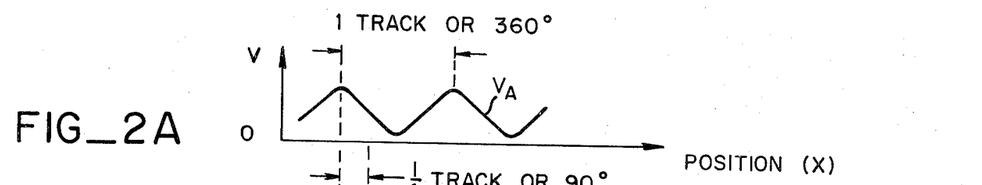
FIG. 2A is a waveform diagram of the phase A photodetector output signal as a function of position with the system of FIG. 1.

With reference to FIG. 1A, actuator position transducer typically includes a spaced pair of photodetectors 2, 3 (e.g., phototransistors) mounted to the actuator housing in light-receiving relationship to an incandescent or solid state light source 5 which is also mounted to the housing. A shuttering mechanism 6 interposed between the photodetectors and light source and responsive to the movement of the actuator modulates the light received by each photodetector in such a way that the two photodetector outputs, hereafter referred to as phase A and phase B, are position-shifted with respect to one another a distance of one-quarter of a track to produce a relative signal phase-displacement of 90° as shown in FIGS. 2A and 2B. The photodetector output waveforms are approximately triangular and each cycle representing 360 electrical degrees corresponds to one track or cylinder.

Because of the position offset the phase B signal will lead the phase A signal by 90° for actuator motion in one direction (e.g., forward) and will lag the phase A signal by 90° for actuator motion in the opposite direction (e.g., reverse) as illustrated by the waveforms of FIGS. 2C and 2D.

Since the amplitude $V_A$ of the phase A output (waveform 2C) is proportional to position the absolute value of the time derivative of the phase A output is proportional to actuator velocity as shown by equations (1) through (5).

$$V_A = K_1 x, \quad a < x < b, \quad K_1 = \text{constant} \quad x = \text{position} \quad (1)$$

$$V_A = -K_1 x, \quad b < x < c \quad (2)$$

$$V_A = |K_1| x, \quad (3)$$

$$V_A/t = \delta(|K_1| x)/\delta t \quad (4)$$

$$= |K_1| \delta x/\delta t \quad (5)$$

$$= |\text{velocity}|$$

Thus the positive and negative peak amplitudes of the phase A time derivative signal as shown in FIG. 2E represent the magnitude of actuator velocity. The circuitry shown in FIG. 1 in block diagram form generates the phase A time derivative signal and full-wave rectifies it either positively or negatively depending on the direction of actuator motion. The rectified signal is then peak-detected and filtered to produce a substantially DC output signal whose amplitude and polarity respectively represent the velocity and direction of motion of the actuator.

Rectification of the phase A time derivative signal is accomplished using a pair of gated analog switches. These switches each comprise a circuit having a signal input line, a gating input line and an output line. Whenever a positive signal is applied to the gating input a signal presented to the signal input is gated through the circuit to the output line.

For actuator motion in a given direction, e.g., reverse, the phase B signal will lead the phase A signal by 90°. Since the phase A signal lags its time derivative by 90°, the time derivative will be in frequency synchronization with the phase B output signal as seen in FIGS. 2C, 2D, and 2E. Similarly, since the phase B signal lags the phase A signal by 90° for motion in the opposite direction, the phase A time derivative will be 180° out of phase with the phase B output signal for forward actuator motion.

These relationships are used in the system of FIG. 1 to generate the appropriate digital commutating signals for gating the phase A time derivative signal and its inverse through the switching network in such a manner as to produce a full-wave rectified output of the proper polarity.

For forward actuator motion of the positive half-cycles of the time derivative are gated through one switch by a pulse train in synchronism therewith, while the negative half-cycles are inverted to positive and gated through the other switch by a second pulse train 180° out of phase with the first, Similarly, for reverse actuator motion the negative half-cycles of the time derivative are gated through one switch while the positive half-cycles are inverted to negative and gated through the second switch.

The gating signals for the two switches of FIG. 1 are derived from the phase B photodetector output signal. One of the gating signals is developed directly from the phase B signal and is in frequency synchronization therewith while the other gating signal is formed by inverting the first and is thus 180° out of phase to the phase B signal. The first gating signal will be referred to herein as "direct" and the second gating signal as "inverse."

The direct gating signal is formed by comparing the phase B output signal to a preselected reference voltage equal to one-half of the peak-to-peak amplitude of the phase B signal. During the time that the phase B signal exceeds the reference level (i.e., a "positive" peak) a gating pulse is generated and terminates when the phase B signal falls below the reference level. This effectively synchronizes the pulses of the direct gating signal with the "above-the-line" half cycles of the phase B signal.

Due to the aforementioned waveform relationships between the phase B output signal and the phase A time derivative signal, for a given direction of actuator motion, e.g., forward, the direct gating signal will be 180° out of phase with the time derivative signal, or in other words, in synchronization with the negative half cycles of the time derivative signal. The inverse gating signal will therefore be in synchronization with the positive half cycles of the phase A time derivative signal.

The time derivative signal and the inverse gating signal are applied to the signal and gating inputs of one of the analog switches while an inverted time derivative signal and the direct gating signal are applied to the signal and gating inputs of the other analog switch. The inverse gating signal gates the positive half cycles of the time-derivative signal through one switch while the direct gating signal gates the positive half cycles of the inverted time derivative signal through the other switch. However, as stated above, the positive half cycles of the inverted time derivative signal are in reality the negative half cycles of the ordinary time derivative signal phase shifted 180° by inversion.

For the assumed direction of motion then, the combined output of two switches is a full-wave positive rectified version of the time derivative signal.

In a similar manner, for actuator motion in the other direction, for example reverse, the phase B signal and thus the direct gating signal is in phase with the phase A time derivative and the inverse gating signal gates the negative peaks of the phase A time derivative through one switch while the direct gating signal gates the positive half cycle of the time derivative signal inverted to negative through the other switch producing a combined switch output signal which is a full-wave negative rectification of the phase A time derivative signal.

Referring now to FIG. 1, the phase A photodetector output signal 10 is applied to the input of differentiating circuit 12 which generates an output at 14 characterizing the time derivative of the phase A signal. This time derivative signal at 14 is 90° phase-advanced with respect to the phase A signal from which it is derived as can be seen from a comparison of FIGS. 2C and 2E. In addition, the time derivative signal is 180° out of phase with the phase B signal for actuator motion in one direction and is in synchronization with the phase B signal for actuator motion in the other direction as shown by FIGS. 2D and 2E.

The phase A time derivative signal is applied to the input of analog inverter 16 which outputs an inverted signal at 18, hereafter referred to as the inverted time derivative signal. The inverted time derivative signal is applied to the signal input 22 of a first analog gating switch 20. Gating switch 20 is designed to pass a signal introduced at its signal input 22 to its output 26 upon coincidence with a positive signal at its gating input 24.

Voltage comparator 28 is supplied with the phase B photodetector output signal 30 at one input and with a fixed reference voltage $V_{ref}$ at its other input. The value of $V_{ref}$ is preselected to be one-half of the peak-to-peak amplitude of the phase B signal. Comparator 28 forms the difference between the phase B signal and $V_{ref}$ and when this difference is positive — i.e., when phase B exceeds $V_{ref}$ — the comparator outputs a digital pulse at 32. When the phase B signal falls below $V_{ref}$ the pulse is terminated. The following pulse is initiated when the phase B signal again rises to an "above-the-line value." this relationship can be seen in FIGS. 2D and 2F.

Since the time derivative signal leads the phase A output signal from whcih it is derived by 90° and since for forward actuator motion the phase B output will be assumed to lag the phase A output by 90°, the pulse train at 32 produced by comparator 28 (the direct gating signal) will be in phase with the inverted time derivative signal at 18. Viewed differently, the pulses of the direct gating signal will be in phase with the negative half cycles of the time derivative signal.

Logic inverter 34 is supplied with the digital output from comparator 28 and phase-shifts this direct gating signal by 180° to output the inverse gating signal at 36. Because the direct gating signal is in phase with the time derivative negative half cycles, the inverse gating signal will be in synchronization with the time derivative positive half cycles.

The direct gating signal is applied to the gating input 24 of analog switch 20 which has the inverted time derivative applied to its signal input 22. Because for forward actuator motion the direct gating signal is in phase with the time derivative negative half cycles, the positive half cycles of the inverted time derivative will be gated to the switch output at 26. At the same time the inverse gating signal is applied to the gating input 44 of the other switch 40 which has its signal input 42 connected directly to the output 14 of differentiator 12 and thus receives the non-inverted time derivative signal. For forward actuator motion the inverse gating signal at 36 is in phase with the positive half cycles of the non-inverted time derivative at 14 and will gate them to the output 46 of switch 40.

The combined switch outputs are applied to summing amplifier 50. For the assumed case of forward actuator motion switch 40 will output a positive half-wave rectified time derivative signal and switch 20 will output a 180° phase-shifted positive half-wave rectified time derivative signal. Summing amplifier 50 combines these two signals and outputs a full-wave positive rectified version of the phase A time derivative signal at 52 corresponding to forward actuator motion.

For actuator motion in the opposite direction — i.e., reverse — the phase B output signal 30 and thus the direct gating signal at 32 will be 180° out of phase with the inverted time derivative at 18 and the inverse gating signal at 36 will be 180° out of phase with the non-inverted time derivative at 14. Thus in this situation the direct gating signal will gate the negative half cycles of the inverted time derivative to summing amplifier 50 through switch 20 and the inverse gating signal will gate the negative half-cycles of the non-inverted time derivative to summing amplifier 50 through switch 40. The output of summing amplifier 50 in this instance will be a full-wave negative rectified version of the phase A time derivative signal corresponding to reverse actuator motion.

Summarizing the operation of the rectification circuit of the system of FIG. 1, for actuator motion in one direction the positive half-cycles of the phase A time derivative signal are gated through the switching network along with positive half cycles of its 180° phase-shifted inverse, thereby producing a full-wave positive rectified output. For actuator motion in the opposite direction the negative half-cycles of the time derivative along with the negative half-cycles of its 180° phase shifted inverse are gated through the switching network to produce a full-wave negative rectified output.

The peak values of the positive full-wave rectified time derivative signal represent the magnitude of actuator velocity in the forward direction while the peak values of the negative full-wave rectified time derivative represents the magnitude of actuator velocity in the reverse direction. In order to eliminate the transition region between peaks which deviates from the true velocity value represented by the peak amplitude, the full-wave rectified signal in the system of FIG. 1 is peak detected and filtered by circuit 54 to provide the substantially constant velocity output signal shown in FIG. 2H.

The solid line of FIG. 2H represents forward actuator velocity while the dotted line represents reverse actuator velocity. When the velocity signal is peak detected and filtered by circuit 54 the time constant of the peak holding filter must be sufficiently short to allow the velocity signal to follow the most rapid velocity changes of the actuator.

Referring now to FIGS. 3 and 4A through 4D an extension of the system shown in FIG. 1 will be described for use in situations where peak holding filters cannot be tolerated and a high degree of accuracy is required such as in very high performance disc file systems.

As mentioned above, the unfiltered velocity signal at 52 generated by the system in FIG. 1 and depicted by the waveform of FIG. 2H is not truly continuous with time since the signal does not represent true velocity during the waveform transitions. Where this type of signal cannot be tolerated the system of FIG. 1 can be extended to the system of FIG. 3 in which both phase A and phase B photodetectors output signals are differentiated and processed exactly as described above to obtain two unfiltered velocity signals whose waveforms are shown in FIGS. 4A and 4B.

Figure 3:
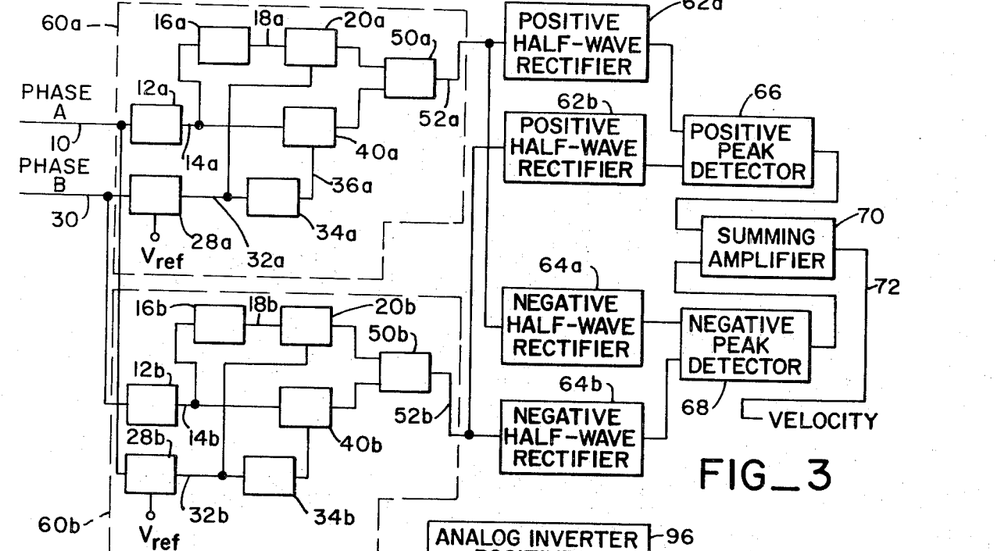
FIG. 3 is a block diagram representation of another embodiment of an electronic velocity signal generating system according to the present invention.
Figures 4A, 4D:
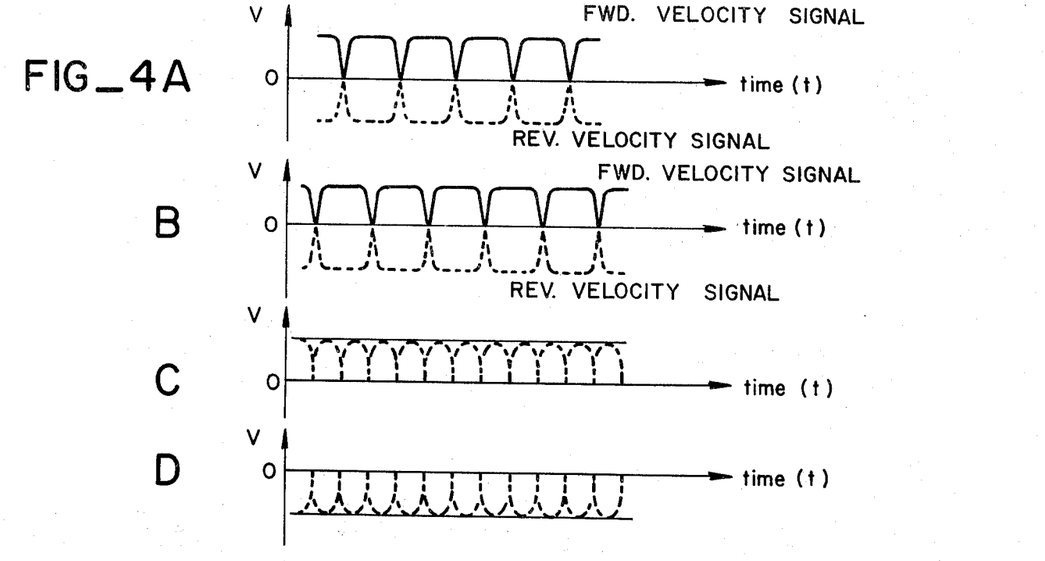
FIG. 4A is a waveform diagram of the full-wave rectified time-derivative of the phase A photodetector output signal for forward and reverse actuator motion at constant velocity with the system of FIG. 3.
FIG. 4D is a waveform diagram of the signals of FIGS. 4A and 4B for reverse actuator motion which have been combined and peak detected to produce a velocity signal.

These two unfiltered velocity signals are generated in two parallel channels 60a and 60b of the system of FIG. 3 each of which is identical to the corresponding portion of the system of FIG. 1. The suffix a will be used to designate the functional unit in channel 60a which corresponds to the analogous component of the system of FIG. 1, while the suffix b will be used in reference to channel 60b.

Taking channel 60a for purposes of illustration, the photodetector output is time differentiated by differentiating circuit 12a and the time derivative signal at 14a and its inverse at 18a produced by inverter 16a are applied to a pair of gated analog switches 20a and 40a. The switches gate their respective signal inputs to summing amplifier 50a upon coincidence with the pulses of a digital commutating signal at 32a from voltage comparator 28a and its inverse at 36a from logic inverter 34a which are in phase with the inverted time derivative and time derivative signal respectively.

Thus, for one direction of motion the positive peaks of the time derivative signal at 14a are gated to summing amplifier 50a by the inverse gating signal through switch 40a and the positive peaks of the inverted time derivative signal are gated to summing amplifier 50a by the direct gating signal through the switch 20a.

With this arrangement both channels produce a full-wave rectified signal at 52a and 52b respectively having a polarity corresponding to actuator motion in the assumed direction and 180° phase displaced from one another.

In the system of FIG. 1 the unfiltered positive or negative full-wave rectified signal whose peaks represent the magnitude of actuator velocity and whose polarity represents the direction of actuator motion are peak detected and filtered to provide a substantially constant DC velocity signal as shown in FIG. 2H. The system of FIG. 3 eliminates any transition effect on the final velocity output signal.

The two channels 60a and 60b are connected in parallel to the phase A and phase B photodetector outputs 10 and 30 respectively and each duplicate the system of claim 1 up to and including the summing amplifiers 50a and 50b. The peak detector and filter 54 of the system of FIG. 1 is replaced in each channel of the system of FIG. 2 by a positive half-wave rectifier 62 and a negative half-wave rectifier 64 each having their input connected to summing amplifier 50.

The outputs of the positive half-wave rectifiers 62 in both channels are connected to the common input of a positive peak detector 66 and the outputs of the negative half-wave rectifiers 64 in each channel are connected to the common input of a negative peak detector 68. The outputs of positive peak detector 66 and negative peak detector 68 are applied to summing amplifier 70 which outputs the final velocity signal at 72 as shown in FIG. 4C for forward actuator motion in FIG. 4D for reverse actuator motion.

Figure 5:
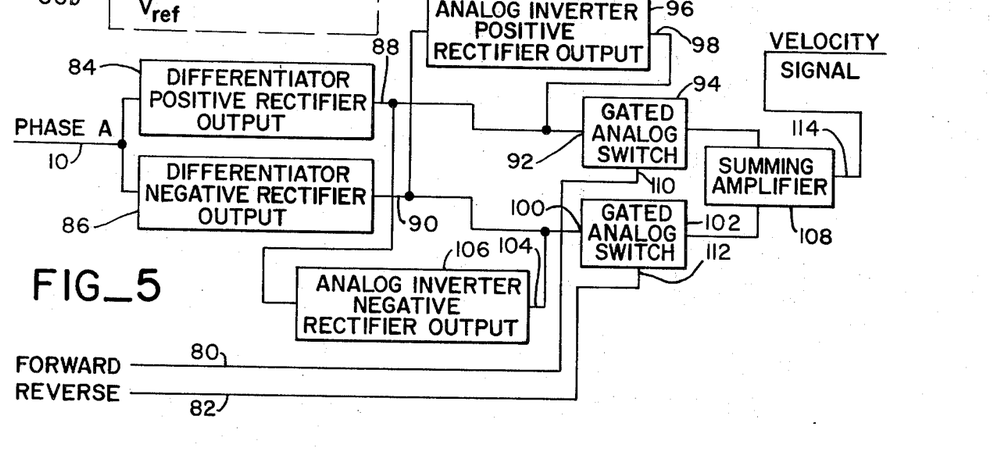
FIG. 5 is a block diagram representation of a further implementation of the velocity signal generation system of the present invention.

In applications where minimum circuit component cost is a significant factor, the system shown in FIG. 5 provides a simple yet effective means for producing an actuator velocity signal.

The arrangement of FIG. 5 eliminates the peak detector and filter of FIG. 1 and replaces the commutating pulse train output of voltage comparator 28 with the forward and reverse logical direction signals 80 and 82 which are typically generated from the optoelectronic position transducer output signals in conventional disc file systems. These DC direction signals used to appropriately gate the phase A time derivative signal and its inverse through the analog switch pair to produce a full-wave rectified signal carrying velocity information. Also the signal differentiating circuit of FIG. 1 which is responsive to the phase A output signal is replaced by a pair of differentiating circuits 84 and 86 having positive and negative rectified outputs, respectively. Full-wave rectification of the phase A time derivative signal is produced in the following manner.

Differentiator 84 outputs the positive half-cycles of the time derivative signal at 88 while differentiator 86 outputs the negative half-cycles of the time differentiated signal at 90. The output from differentiator 84 is applied directly to the signal input 92 of gated analog switch 94 while the output from differentiator 86 is inverted by analog inverter 96 which outputs a positive rectified signal at 98. The inverted signal at 98 as well as the signal at 88 are applied to the signal input 92 of analog switch 94. Thus the signal at the input 92 at switch 94 will be a positive full-wave rectified time derivative.

In a similar manner the output at 90 from differentiator 86 is supplied directly to the signal input 100 of the other gated analog switch 102 along with the output at 88 from differentiator 84 which is inverted at 104 by analog inverter 106 having a negative rectifier output. Thus, the signal at the input of gated analog switch 102 will be a negative full-wave rectified time derivative.

Figures 6A, 6E:
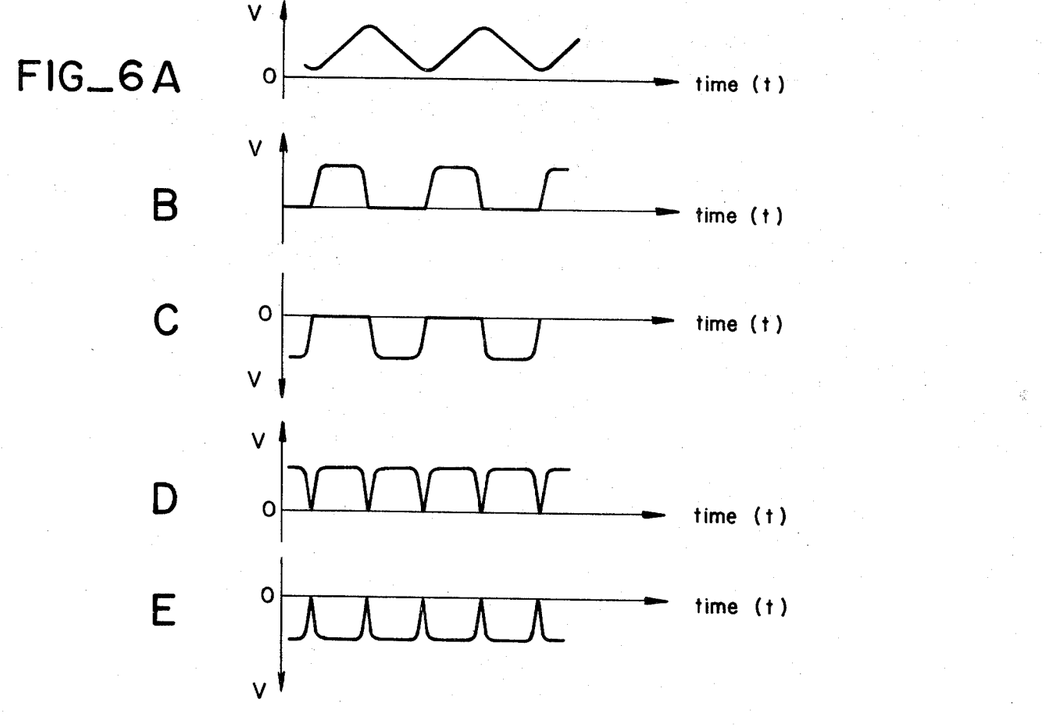
FIG. 6A is a waveform diagram of the phase A photodetector output signal as a function of time at constant velocity with the system of FIG. 5.
FIG. 6E is a waveform diagram of the signal of FIG. 6C which has been negative full-wave rectified to produce a velocity signal indicative of actuator motion in the opposite direction.

Either the positive full-wave rectified signal applied to switch 94 or the negative full-wave rectified signal applied to switch 102 will be gated to summing amplifier 108 according to whether the forward digital direction signal 80 or the reverse direction signal line 82 is energized. This is accomplished by applying the forward direction signal at 80 to the gating input 110 of analog switch 94 and the reverse direction signal at 82 to the gating input 112 of analog switch 102. The outputs of analog switches 94 and 102 are applied to the input of summing amplifier 108. Summing amplifier 108 outputs the velocity signal at 114 as shown in FIG. 6D for one direction of actuator motion and FIG. 6E for the opposite direction of motion.

With the embodiment of FIG. 5, system performance is degraded to the extent that the polarity of the velocity signal can be in error up to one-half track or error signal cycle since direction is usually tested only at the zero crossings of the positive signal or even one-half track. However, the system uses two differentiators which due to the unique system configuration of FIG. 5 results in a minimum circuit component cost.

The differentiator and inverter with the positive rectified outputs are connected in a "wired-or" configuration as are the differentiator and inverter with the negative rectified outputs. With this configuration a signal is developed at the input of analog switch 94 which is proportional to the velocity but always of positive polarity regardless of the actuator direction of motion (FIG. 6D). In a like manner a negative signal is developed at the input to analog switch 102 regardless of direction of actuator motion. The usable velocity signal at 114 with the proper polarity for direction is obtained by gating to summing amplifier 108 the positive signal input to analog switch 94 or the negative signal input to analog switch 102 depending on whether the forward or reverse DC direction signal obtained from the position transducer direction detector is present at the corresponding gating input.

Figure 7:
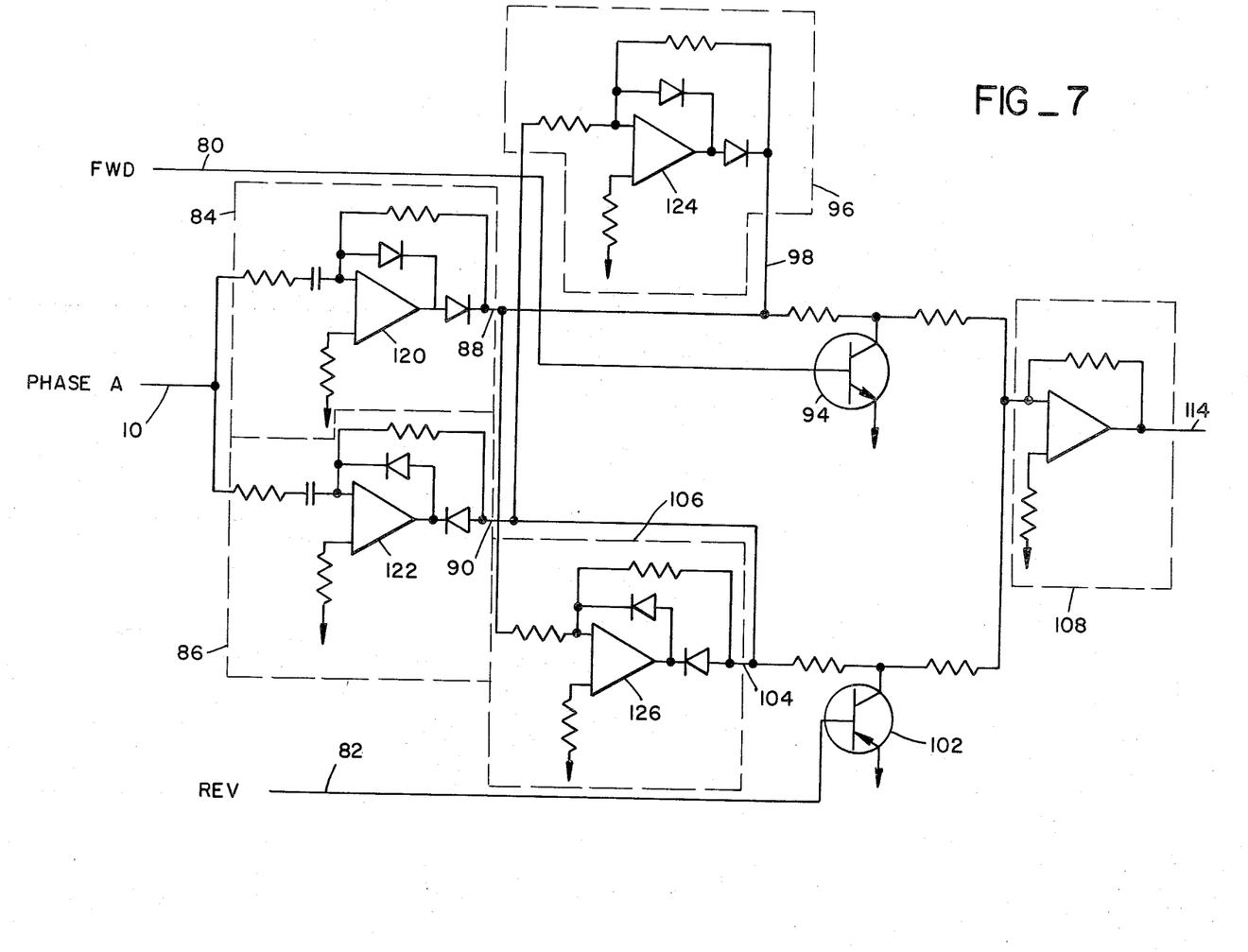
FIG. 7 is a circuit diagram of some of the electronic components of the system of FIG. 5.

The simplicity of the velocity detection system implementation is shown in the circuit diagram of FIG. 7 which shows electronics built around low cost operational amplifiers. Amplifiers 120 and 122 are connected at differentiators with a typical half-wave rectifier output configuration, amplifier 120 as a positive rectifier and amplifier 122 as a negative rectifier. Amplifier 124 and 126 are connected in an inverting amplifier configuration with amplifier 124 having a positive rectifier output and amplifier 126 having a negative rectifier output. Because of the rectifier outputs, the amplifiers with the same polarity outputs can be connected in an analog version of the "wired-or" configuration, creating the full-wave, unfiltered velocity signals.

It will be appreciated that all of the circuit components disclosed herein in diagrammatic form, such as differentiators, inverters, comparators, peak detectors, filters, and summing amplifiers are of conventional design and construction well known to those skilled in the art. Consequently the velocity signal generating system of the present invention can be easily synthesized using standard off the shelf electronic components.

While several embodiments of the present invention have been shown and described herein, it will be apparent that further modifications hereof and variations therefrom can be made without departing from the scope of the invention as defined by the appended claims.

What is claimed is:

1. An electronic velocity detection system for use with an opto-electronic position transducer associated with a linear motion actuator and having an illuminated pair of photo detectors which output first and second 90° displaced position signals, comprising:
    first circuit means responsive to said first position signal for generating the time derivative thereof;
    second circuit means responsive to said time derivative signal for full wave rectification thereof to produce an output having a peak magnitude representative of actuator motion, said rectification means including
    signal inverting means for inverting said time derivative signal to form an inverted time derivative signal therefrom,
    pulse generating means responsive to said second position signal for generating a first pulse train in phase-synchronization therewith,
    pulse inverting means responsive to said first pulse train for producing a second pulse train 180° out of phase therewith, and
    a switching network for gating said time derivative signal to an output upon coincidence with pulses of said secodn pulse train and gating said inverted time derivative signal to said output upon coincidence with pulses of said first pulse train.

2. Apparatus according to claim 1 wherein said pulse generating means comprises a voltage comparator responsive to the difference between said second position signal applied to a first input and a fixed reference signal equal to one-half of the peak-to-peak amplitude of said second position signal applied to a second input, said comparator generating the pulses of said pulse train when said second position signal is greater than said reference signal.

3. Apparatus according to claim 1 wherein said switching network comprises a pair of gated analog switches including a first switch for gating said time derivative signal to an output upon coincidence with pulses of said second pulse train and a second switch for gating said inverted time derivative signal to an output upon coincidence with pulses of said first pulse train.

4. Apparatus according to claim 3 wherein the individual outputs from said first and second switches are applied to the input of a summing amplifier, whereby said time derivative signal is full-wave rectified with a polarity corresponding to the direction of actuator motion.

5. Apparatus according to claim 1 further comprising peak detecting and filtering means responsive to the peak amplitude of said full-wave rectified time derivative signal for producing a velocity signal therefrom.

6. An electronic velocity detection system for use with an opto-electronic position transducer associated with a linear motion actuator and having an illuminated pair of photo detectors which output first and second 90° displaced position signals, comprising:
- circuit means responsive to said first position signal for generating a full-wave rectified time derivative signal therefrom, said time derivative signal having an amplitude and polarity representative of actuator velocity;
- circuit means responsive to said time derivative signal for generating a velocity signal therefrom;
- circuit means responsive to said second position signal for generating a full-wave rectified time derivative signal therefrom, said time derivative signal having an amplitude and polarity identical to said first position signal rectified time derivative and being 180° out of phase therewith;
- a pair of positive half-wave rectifiers, each responsive to a corresponding one of said first and second position signal rectified time derivatives;
- a pair of negative half-wave rectifiers, each responsive to a corresponding one of said first and second position signal rectified time derivatives;
- a positive peak detector responsive to the combined outputs of said pair of positive half-wave rectifiers;
- a negative peak detector responsive to the combined outputs of said negative half-wave rectifiers; and
- a summing amplifier responsive to the combined outputs of said positive peak detector and said negative peak detector for producing a velocity signal therefrom.

7. An electronic velocity detection system for use with an opto-electronic position transducer associated with a linear motion actuator and having an illuminated pair of photo detectors which output first and second 90° displaced position signals, comprising:
- circuit means responsive to said first position signal for generating a full-wave rectified time derivative signal therefrom, said time derivative signal having an amplitude and polarity representative of actuator velocity;
- circuit means responsive to said time derivative signal for generating a velocity signal therefrom;
- a pair of differentiators responsive to said first position signal, including a first differentiator having a positive rectifier output and a second differentiator having a negative rectifier output;
- a pair of analog inverters including a first inverter responsive to the output of said second differentiator and having a positive rectifier output to produce a positive inverted time derivative signal therefrom and a second inverter responsive to the output of said first differentiator and having a negative rectifier output to produce a negative inverted time derivative signal therefrom;
- a first gated analog switch responsive to the combined outputs of said first differentiator and said first inverter for gating said signals to an output upon coincidence with a digital signal from said opto-electronic transducer indicative of actuator motion in a particular direction to produce a full-wave positive rectified time derivative signal at said output corresponding to actuator motion in that direction;
- a second gated analog switch responsive to the combined outputs of said second differentiator and said second inverter for gating said signals to an output upon coincidence with a digital signal from said opto-electronic transducer indicative of actuator motion in the opposite direction to produce a full-wave negative rectified time derivative signal at said output corresponding to actuator motion in that direction; and
- a summing amplifier responsive to the combined outputs of said first and second gated analog switches for producing a velocity signal therefrom.

8. A velocity detection system for indicating the velocity of a linear motion actuator having an opto-electronic position transducer of the type wherein a pair of photodetectors is illuminated with a light beam modulated by a shuttering mechanism responsive to actuator movement to produce 90° displaced first and second photodetector output signals, comprising:
- an analog inverter responsive to said time derivative signal for forming an inverted time derivative signal therefrom;
- a voltage comparator responsive to the difference between said second photodetector output signal applied to a first input and a fixed reference signal equal to one-half of the peak-to-peak amplitude of said second output signal applied to a second input, said comparator generating pulses of a first train when said second photodetector output is greater than said reference signal;
- a logic inverter responsive to the output of said voltage comparator for inverting said first pulse train to produce a second pulse train;
- a first gated analog switch responsive to the output of said analog inverter applied to the signal input thereof for gating said inverted time derivative signal to an output upon coincidence with pulses of said first pulse train applied to the gating input thereof;
- a second gated analog switch responsive to the output of said differentiator applied to the signal input thereof for gating said time derivative signal to an output upon coincidence with pulses of said second pulse train applied to the gating input thereof;
- a summing amplifier responsive to the combined outputs of said first and second gated analog switches for producing a combined signal therefrom; and
- a peak detector and filter responsive to said combined signal for detecting the peak amplitude thereof and filtering said peak amplitude to output a substantially constant velocity signal.

9. In a linear motion actuator having associated therewith an opto-electronic position transducer of the type wherein a shuttering mechanism responsive to the movement of said actuator modulates a light beam impinging on a spaced pair of photodetectors to generate first and second 90° phase-displaced output signals therefrom carrying position and direction information, the improvement comprising: a system for electronically processing said photodetector output signals to generate a signal representative of the velocity of said actuator including
- first circuit means responsive to said first output signal for generating a time derivative signal therefrom, said time derivative signal being 90° phase displaced from said first output signal so as to be frequency synchronized with said second output signal for one direction of actuator motion and 180° out of phase with said second output signal for the opposite direction of actuator motion;

second circuit means responsive to said time derivative signal for producing a positive full-wave rectified signal therefrom corresponding to actuator motion in one direction and a negative full-wave rectified signal therefrom corresponding to actuator motion in the opposite direction; and third circuit means responsive to said rectified time derivative signal for detecting the peak amplitude and polarity thereof to generate a signal representing the velocity of said actuator.

10. Apparatus according to claim 9 wherein said third circuit means includes means for filtering said rectified time derivative signal to generate a substantially constant D.C. signal therefrom having a value representative of the speed of said actuator and a polarity representative of the direction of motion of said actuator.

11. Apparatus according to claim 9 wherein said second circuit means comprises:

an analog inverter responsive to said time derivative signal for generating an inverted time derivative signal therefrom;

pulse generating means responsive to said second photodetector output signal for generating a first train in frequency synchronization therewith;

a logic inverter responsive to said first pulse train for generating a 180° phase-shifted second pulse train therefrom; and a pair of gated analog switches including a first switch for gating said time derivative signal to an output upon coincidence with pulses of said second pulse train, and a second switch for gating said inverted time derivative signal to said output upon coincidence with pulses of said first pulse train, whereby said time derivative signal is full-wave rectified with a polarity relfecting the direction of actuator motion.

12. Apparatus according to claim 11 wherein said pulse generating means comprises a voltage comparator responsive to the difference between said second output signal applied to a first input and a fixed reference voltage equal to one-half of the peak-to-peak amplitude of said second output signal applied to a second input, said comparator generating the pulses of said first pulse train when said second output signal is greater than said reference voltage.

13. Apparatus according to claim 9 further comprising:

fourth circuit means responsive to said second output signal for generating the time derivative thereof;

fifth circuit means responsive to said time derivative signal for producing a positive full-wave rectified signal therefrom corresponding to actuator motion in one direction and a negative full-wave rectified signal therefrom corresponding to actuator motion in the opposite direction, said fifth circuit means being identical to and electrically parallel with said second circuit means with the output of said second and fifth circuit means having identical amplitude and polarity and being 180° out of phase with each other;

first positive and negative half-wave rectifiers responsive to the output of said second circuit means;

second positive and negative half-wave rectifiers responsive to the output of said fifth circuit means;

a positive peak detector responsive to the combined outputs of said first and second positive half-wave rectiifers;

a negative peak detector responsive to the combined outputs of said first and second negative half wave rectifiers; and a summing amplifier responsive to the combined outputs of said positive and negative peak detectors and generating a velocity signal therefrom.

14. Apparatus according to claim 9 wherein said first circuit means comprises first and second differentiators responsive to said first output signal, said first differentiator having a positive rectifier output and said second differentiator having a negative rectifier output;

a first analog inverter responsive to the output of said second differentiator and having a positive rectifier output;

a second analog inverter responsive to the output of said first differentiator and having a negative rectifier output;

a first gated analog switch responsive to the coincidence of the combined outputs of said first differentiator and said first analog inverter with a digital signal from said position transducer indicating forward motion of said actuator for gating said combined signal through said switch upon coincidence with said forward digital signal;

a second gated analog switch responsive to the coincidence of the combined output of said second differentiator and said second analog inverter with a digital signal from said position transducer indicating reverse motion of said actuator for gating said combined signal through said switch upon coincidence with said reverse digital signal; and a summing amplifier responsive to the combined output of said first and second switches to produce a velocity signal therefrom.

15. The method of electronically determining the velocity of a linear motion actuator having associated therewith an opto-electronic transducer including a spaced pair of illuminated photo detectors comprising the steps of:

detecting the output from a first one of said photodetectors;

generating a time derivative signal from said first photodetector output;

inverting said time derivative signal to obtain a 180° phase-shifted inverted time derivative signal;

gating the positive half cycles of said time derivative signal and said inverted time derivative signal through a switching network upon movement of said actuator in one direction and the negative half cycles of said time derivative signal and said inverted time derivative signal through said switching network upon movement of said actuator in the opposite direction;

detecting the peak value and polarity of the signal output from said switching network to produce a velocity signal therefrom.

16. The method of claim 15 wherein said gating step includes:

detecting the output from the second one of said photodetectors;

generating a first digital pulse train in synchronization with said second photodetector output signal, said pulse train being in synchronization with said time derivative signal for actuator motion in one direction and 180° out of phase with said time derivative signal for actuator motion in the opposite direction;

inverting said first pulse train to form a second pulse train;

applying said time derivative signal to the signal input of a first analog switch and said inverted time derivative signal input of a second analog switch while simultaneously applying said first pulse train to the gating input of said second analog switch and said second pulse train to the gating input of said first analog switch;

combining the output of said first and second analog switches, whereby said time derivative signal is full-wave positive rectified for actuator motion in one direction and full-wave negative rectified for actuator motion in the opposite direction.

17. The method of claim 15 comprising the further step of filtering the peak value of the combined signal output from said switches to provide a substantially constant D.C. signal representative of actuator velocity.

18. The method of claim 15 comprising the further steps of:

detecting the output from a second one of said photodetectors and generating therefrom a full-wave rectified time derivative signal having the same amplitude and polarity for a given direction of actuator motion as the full-wave rectified time derivative signal derived from said first photodetector output and being 90° phase displaced relative thereto;

applying said first time derivative to first parallel negative and positive half-wave rectifiers;

applying said second time derivative to second parallel negative and positive half-wave rectifiers;

applying the combined output from said first and second positive half-wave rectifiers to a positive peak detector and the combined output from said first and second negative half-wave rectifiers to a negative peak detector; and applying the combined outputs from said positive and negative peak detectors to a summing amplifier to produce a velocity signal therefrom.

19. The method of electronically processing the 90° phase displaced output signals from a pair of photodetectors in an opto-electronic position transducer associated with a linear motion actuator to derive an actuator velocity signal therefrom, comprising the steps of:

detecting a first one of said output signals and differentiating said signal to produce a first time derivative signal therefrom;

inverting said first time derivative signal to obtain a first inverted time derivative signal 180° out of phase therewith;

applying the second of said output signals to one input of a first comparator responsive to the difference between said second output signal and a fixed reference signal equal to one-half of the peak-to-peak amplitude of said second output signal applied to another input, said first comparator adapted to generate a first pulse train when said second output signal exceeds said reference signal, whereby said first pulse train is in phase synchronization with said second output signal;

phase-shifting said first pulse train 180° to produce a second pulse train;

gating said first time derivative signal through a first switching network to an output upon coincidence with pulses of said second pulse train and simultaneously gating said first inverted time derivative signal through said first switching network to said output upon coincidence with pulses of said first pulse train; generating a velocity signal from the output of said switching network.

20. The method of claim 19 comprising the further steps of:

differentiating said second output signal to produce a second time derivative signal therefrom;

inverting said second time derivative signal to obtain a second inverted time derivative signal 180° out of phase therewith;

applying said first output signal to one input of a second comparator responsive to the difference between said first output signal and a fixed reference signal equal to one-half of the peak-to-peak amplitude of said first output signal applied to another input, said second comparator adapted to generate a third pulse train when said first output signal exceeds said reference signal, whereby said third pulse train is in phase synchronization with said first output signal;

phase shifting said third pulse train 180° to produce a fourth pulse train;

gating said second time derivative signal through a second switching network to an output upon coincidence with pulses of said fourth pulse train and simultaneously gating said second inverted time derivative signal through said second switching network to said output upon coincidence with pulses of said third pulse train;

combining the outputs from said first and second switching networks; and detecting the peak amplitude and polarity of said combined signal to produce a velocity signal therefrom.

21. The method of claim 20 wherein the step of combining the outputs from said first and second switching networks includes applying the output from said first switching network to first positive and negative half-wave rectifiers and applying the output from said second switching network to second positive and negative half-wave rectifiers and wherein said peak detecting step includes applying the output from said first and second positive half-wave rectifiers to a positive peak detector, applying the output of said first and second negative half-wave rectifiers to a negative peak detector, and applying the combined outputs from said positive and negative peak detectors to a summing amplifier which outputs said velocity signal.

* * * * *